United States Patent [19]

Barber

[11] Patent Number: 4,706,482

[45] **Date of Patent: * Nov. 17, 1987**

[54] PERMANENTLY-INSTALLED TEST FITTING

[76] Inventor: John C. Barber, 3915 Canal Rd., Lake Worth, Fla. 33461

[ * ] Notice: The portion of the term of this patent subsequent to Jul. 29, 2003 has been disclaimed.

[21] Appl. No.: 891,201

[22] Filed: Jul. 28, 1986

Related U.S. Application Data

[63] Continuation-in-part of Ser. No. 706,322, Feb. 27, 1985, Pat. No. 4,602,504.

[51] Int. Cl.[4] .............................................. G01M 3/04

[52] U.S. Cl. ........................................ 73/49.8; 138/89; 277/DIG. 10

[58] Field of Search ................ 73/49.8, 46, 49.1, 49.5; 138/89, 90; 277/DIG. 10

[56] References Cited

U.S. PATENT DOCUMENTS

| | | | |
|---|---|---|---|
| 2,553,267 | 5/1951 | Nedoh | 220/89 A |
| 3,467,120 | 9/1969 | Hill et al. . | |
| 3,605,947 | 9/1971 | Salerno et al. . | |
| 3,921,556 | 11/1975 | Wood et al. . | |
| 3,941,156 | 3/1976 | Metzger | 138/90 |
| 4,044,798 | 8/1977 | Feldstein et al. | 138/90 |
| 4,139,005 | 2/1979 | Dickey | 138/89 |
| 4,289,169 | 9/1981 | Banholzer | 138/117 |
| 4,329,857 | 5/1982 | Kittle et al. | 220/229 |
| 4,376,597 | 3/1983 | Britton et al. | 138/89 X |
| 4,402,516 | 9/1983 | Gans et al. | 277/DIG. 10 X |
| 4,429,568 | 2/1984 | Sullivan | 73/49.8 |
| 4,460,019 | 7/1984 | Condon | 138/90 |
| 4,542,642 | 9/1985 | Tagliarino | 138/90 X |
| 4,607,664 | 8/1986 | Carney et al. | 138/89 |

*Primary Examiner*—Stewart J. Levy
*Assistant Examiner*—Joseph W. Roskos
*Attorney, Agent, or Firm*—Steele, Gould & Fried

[57] ABSTRACT

An apparatus is provided for pressure testing pipe and fittings systems. A seal has a disk portion and a flange portion. The seal is permanently attached to the inside of a fitting on the distal end of the pipe section to be tested, thereby blocking fluid flow. The section is installed and tested by conventional means. After testing, a pull-tab formed in the seal is removed to permit fluid flow through the seal. Subsequent sections can then be installed and tested.

18 Claims, 19 Drawing Figures

PERMANENTLY-INSTALLED TEST FITTING

CROSS REFERENCE TO RELATED APPLICATIONS

This application is a continuation-in-part application of Applicant's co-pending application Ser. No. 706,322, filed Feb. 27, 1985, now U.S. Pat. No. 4,602,504.

BACKGROUND OF THE INVENTION

1. Field of the Invention

This invention relates generally to fittings for pressure testing pipe connections, and more specifically, to permanently-installed blocking test fittings.

2. Description of the Prior Art

Large pipe systems are usually installed by joining together a number of pipe sections. Accordingly, the installation process can involve the formation of hundreds, if not thousands, of joints between these sections. It is desirable to test joints after they have been formed because it is easier to make repairs before the system is completed. Government codes often require such tests.

Blocking apparatus designed to assist pressure testing typically comprise a plug which is placed into a fitting or section of pipe. The plug seals the pipe so that water can be introduced, whereupon the pipe section and joints thereabove can be inspected for leaks. After inspection the plug is removed or otherwise rendered inoperable to allow fluid flow through the section. Prior art apparatus have typically used a pneumatically inflatable plug. The inflatable apparatus can be expensive to use and susceptible to leakage. Also, the elastic material used in these apparatus can dry and rot. They also can burst unexpectedly, causing a gush of water, or worse, during testing.

Sullivan's U.S. Pat. No. 4,429,568 discloses a pressure testing assembly including a T or Y test section. A flapper valve closes the pipe to fluid flow and the pipe above the valve is filled with water through a faucet in the Y or T section. The system is inspected for leaks, after which the flapper valve is opened to remove the water. This apparatus would be expensive to use and time consuming to install.

The present invention provides a simple to use and inexpensive apparatus for pressure testing pipe and fittings. According to the present invention, a test fitting is permanently installed in the pipe system. The test fitting is fashioned with a permanently removable seal such that, when testing is complete, a portion of the seal can be removed, allowing unobstructed fluid flow through the pipe. The present invention also obviates the need to remove a test fitting, and in so doing, disassemble any portion of the pipe system which has already been tested.

SUMMARY OF THE INVENTION

It is an object of the present invention to provide an apparatus for pressure testing pipe and fittings which is inexpensive to fashion.

It is another object of the present invention to provide an apparatus for pressure testing pipe and fittings which will not leak.

It is yet another object of the present invention to provide an apparatus for pressure testing pipe and fittings which will not deteriorate with age.

It is still another object of the present invention to provide an apparatus and method for pressure testing pipe and fittings which is easy to use.

These and other objects are accomplished by a test fitting with a water impermeable barrier adapted to block fluid flow through the pipes. The test fitting includes means for sealably and permanently installing the barrier into a fitting or engaging a distal end of a pipe. The barrier has a frangibly removable seal. When pressure testing is complete, the seal is broken and removed so as to permit fluid flow through the pipe, whereupon additional sections of pipe can be added.

In one embodiment, the barrier has a support ring encircling and sealably engaging its perimter. The support ring is adapted for fixed attachment to the interior of a fitting. This embodiment is particularly suited for PVC fittings. Structure can be provided at the periphery of the support ring to facilitate attachment to the interior of the fitting. In one embodiment, an elastomeric o-ring can encircle the support ring to sealably and permanently mount the test fitting within the plumbing fitting. In an another embodiment, a plurality of flexible fins may be formed around the periphery of the support ring. The flexible fins give way when the test fitting is forced into the plumbing fitting to sealably and permanently install the test fitting within the plumbing fitting.

In another embodiment, an elastomeric sleeve with internal parallel circumferential flanges engages the barrier therebetween. The sleeve is adapted to also engage the distale nds of a pipe and a fitting which are joined together, with the barrier therebetween. Means are provided to sealably secure the sleeve to the pipes.

In still another embodiment, an elastomeric support flange encircles and sealably engages the perimeter of the barrier. The support flange is adapted to engage an end of a pipe and to so hold the barrier between the ends of the pipe and the fitting to which the pipe is joined. An elastomeric sleeve is a dapted to engage the distal ends of the pipe and the fitting with the barrier therebetween. Means are provided to sealably secure the sleeve to the pipe and the fitting.

Structure can be provided in the barrier to permit the user to bleed water past the barrier without breaking the seal. This is desirable where a joint is found to be defective and must be re-formed. This structure can include a drainage nipple permanently formed in the barrier or it can be a fitting detachably mounted to the barrier. Conduit means such as a flexible hose can be attached to the structure to pass the water out of the plumbing system whereby the joint can be repaired without interference from water in the area of the joint. The bleeding structure can include valve or clamp structure to prevent fluid flow when it is not desired.

BRIEF DESCRIPTION OF THE DRAWINGS

There are shown in the drawings embodiments which are presently preferred. It should be understood, however, that the invention is not limited to the precise arrangements and instrumentalities shown.

DETAILED DESCRIPTION OF THE PREFERRED EMBODIMENTS

Figure 2:
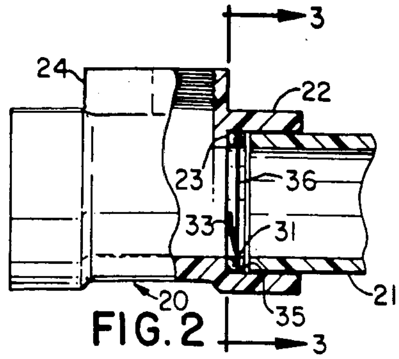
FIG. 2 is a side elevation of the invention as assembled, partially in section.
Figure 3:
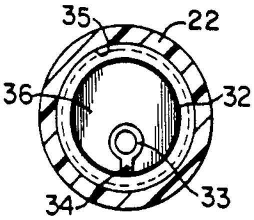
FIG. 3 is a cross-section taken along the line 3—3 in FIG. 2.
Figure 1:
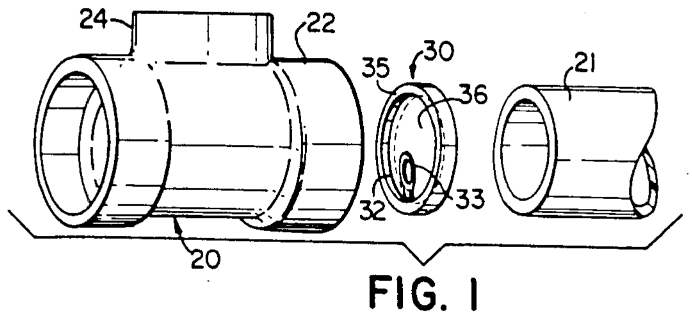
FIG. 1 is an exploded perspective view of the invention.

Referring to FIGS. 1–3, a T-shaped pipe fitting 20 is to be joined with a pipe 21. The pipe fitting 20 will commonly have a T arm 24 and a receiving flange or female end 22 with an inside diameter just exceeding the outside diameter of the distal end of the pipe 21, which forms a corresponding male mating section. The end 22 terminates inwardly at an abutment surface 23. A joint is normally formed by slippig the male section 21 into the end 22 of the pipe fitting 20, where it can engage the abutment surface 23. In plastic pipes as illustrated, a solvent adhesive is spread around the inside surface of the end 22 and on the outside surface of the male section 21 to render the resulting joint water tight. Sometimes the adhesive is applied in a more limited fashion, for example to abutment surface 23 and the mating edge of the end of pipe 21.

After the joint has been formed, it is a common practice to test the joint for leakage. This test can be successfully performed by blocking fluid flow downstream from the joint and causing water to fill the pipe and joint, whereupon any leaks can be easily detected by visual inspection or by other methods known in the art. The obstruction is then removed and construction of the system continues.

It has been found that such testing can be easily and inexpensively performed by fixedly attaching a test fitting 30 to the inside of a fitting so as to block fluid flow therethrough. The test fitting has a water impermeable barrier 31 which can withstand pressures associated with pressure testing. The barrier includes a frangible, removable seal portion 36. When testing is complete, the seal is easily broken and removed. The water is thereby drained, leaving the pipe with little or no obstruction to fluid flow. The system is then ready for the addition of more pipe.

The seal 36 can be similar in construction to the lids found in commercial packaging products such as tennis ball cans. The seal is formed preferably by a scribe cut 32 in the surface of the barrier material. The scribe cut weakens the structure of the barrier material so that a sufficient force will cause the seal to separate from the surrounding barrier material along the scribe cut. The seal can then be removed from the fitting to allow fluid flow through the opening which remains.

The force used to separate the seal from the surrounding barrier material is commonly manual in nature and transmitted to the seal by means such as the pull ring 33. The pull rings is of a size and shape typically found in rings associated with soda cans or tennis ball cans and usually is adapted to receive the index finger. The pull ring could, of course, be adapted to receive more than one finger. It could alternatively be replaced by a structure adapted to receive an instrument which would transmit the force from the hand to the seal. This would be especially desirable where the size or shape of the pipe makes the pull ring difficult to reach with a hand. The pull ring is usually attached to the seal near the scribe cut 32 and forms a lever so that the manual force is transmitted closely to the scribe cut area. This helps to effect initial separation of the seal from the surrounding barrier material. The attachment can be made by any suitable attachment means known in the art such as rivet 34. It is preferable if the attachment means is designed such that the ring is at a 45° angle to the disk surface. This facilitates placement of the finger or a tool into the ring notwithstanding its location within the pipe system.

The test fitting 30 further includes a ring-shaped support 35 to which the barrier is mounted. The support is preferably U-shaped in cross-section so as to receive the barrier between legs of the U. The support can be formed by molding it directly to the barrier.

The installation of the test fitting 30 is easily performed. A suitable adhesive material (for example, the same solvent adhesive if the fitting is plastic) is applied to the outer perimeter of the support 35. Glue is applied to the test fitting, which is then slipped into place inside the end 22 of the pipe fitting 20, against the surface 23 and with the pull ring 33 facing the "T" arm, whereupon the test fitting becomes permanently and sealably attached. The presence of the test fitting 30 does not interfere with the formation of a pipe joint as previously described. The pipe 21 is attached as before with a proper adhesive sealant.

Figure 14:
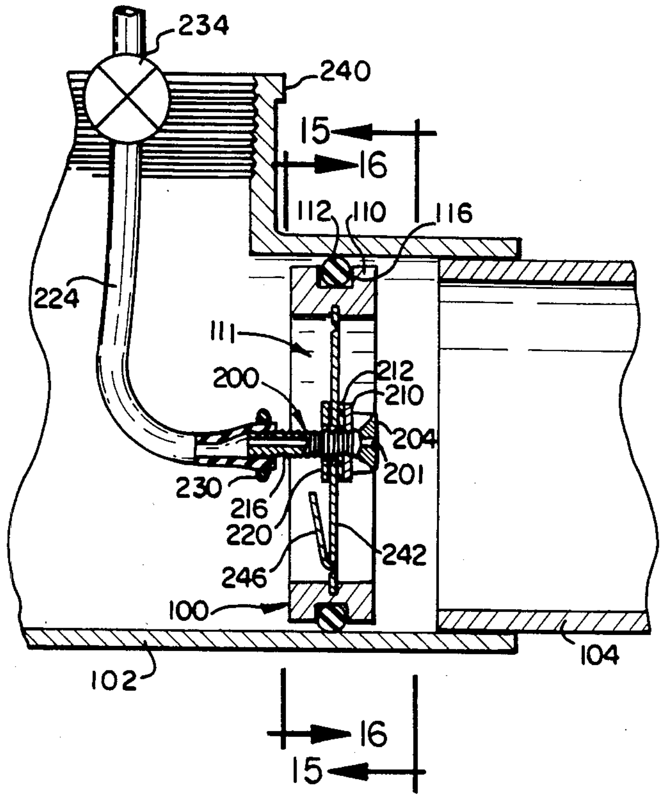
FIG. 14 is a cross-section of an alternative embodiment of the invention installed In a plumbing fitting.
Figure 17:
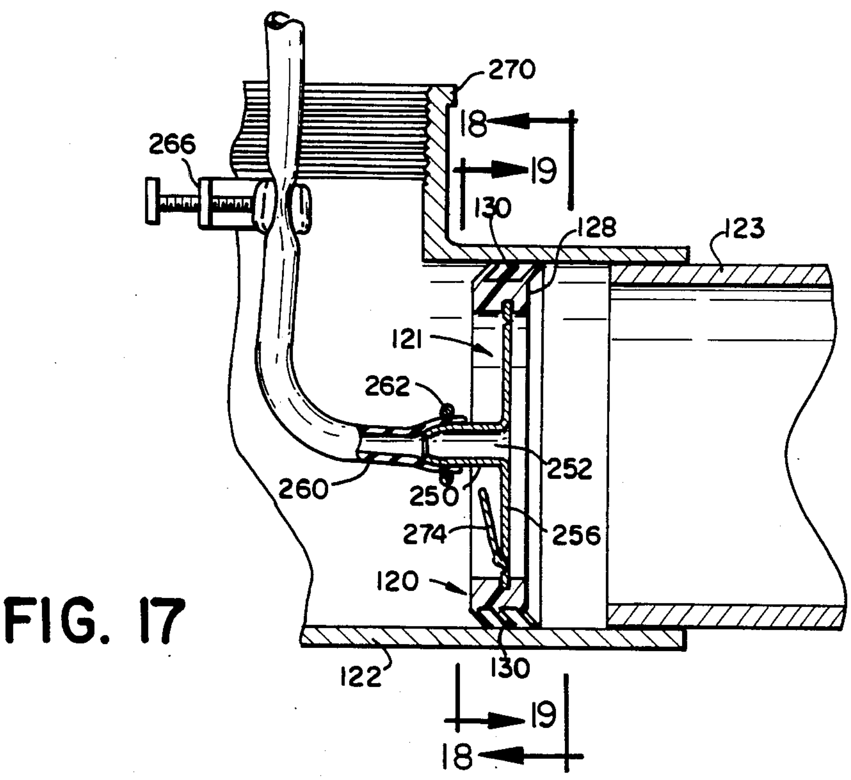
FIG. 17 is a cross-section of an alternative embodiment of the invention installed in a plumbing fitting.
Figure 15:
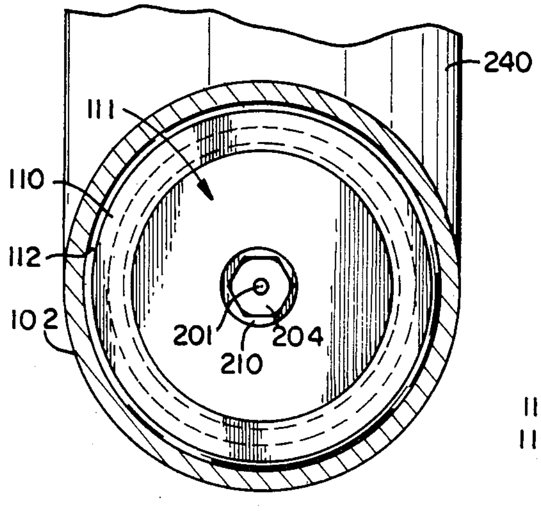
FIG. 15 is a cross-section taken along the line 15—15 in FIG. 14.
Figure 16:
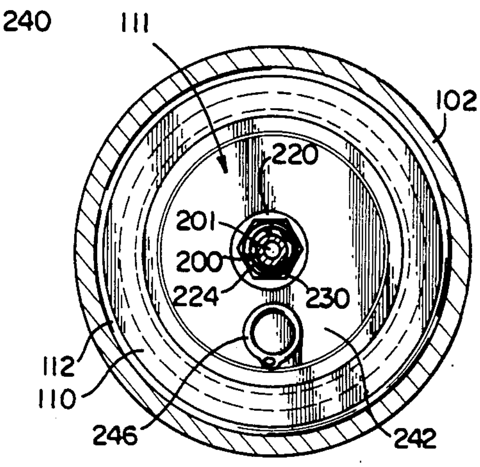
FIG. 16 is a cross-section taken along line 16—16 in FIG. 14.
Figure 18:
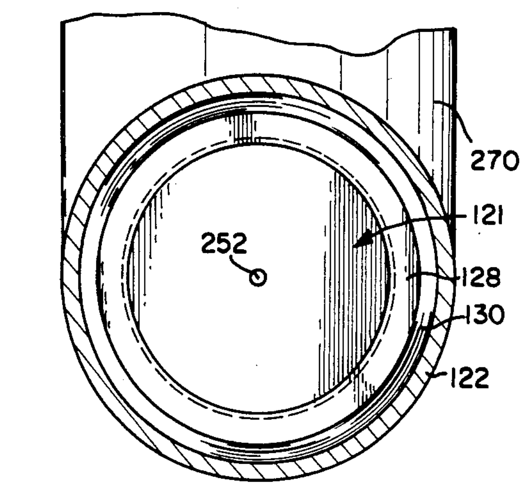
FIG. 18 is a cross-section taken along the line 18—18 in FIG. 17.
Figure 19:
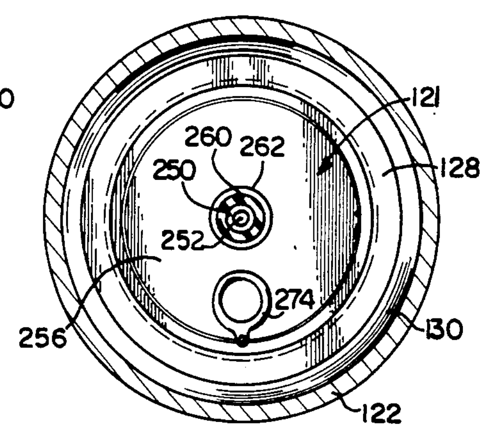
FIG. 19 is a cross-section taken along the line 19—19 in FIG. 17.

While solvent adhesives are the preferred means for attaching the seal to the inside walls of PVC fittings and the like, it will be apparent to one skilled in the art that any of a number of attachment means could be used. These may vary depending on the different materials chosen for the support 35, and for the different materials which make up the pipe section. It is possible to construct a test fitting, for example the embodiment as described above, which is also substantially self sealing. In FIGS. 14–16, there is shown a testing fitting 100 mounted within a pipe fitting 102. The pipe fitting 102 is joined to a pipe 104. A support ring 110 engages a fluid barrier 111 of the test fitting 100. Elastic seal means such as an o-ring 112 is mounted about the periphery of the support ring 110, as in the channel 116. The elastic o-ring 112 is dimensioned to press outwardly against the interior wall of the pipe fitting 102 to sealably adhere the test fitting 100 within the plumbing fitting 102 in a tight and secure fashion. An adhesive may not even be necessary. Alternative means for installing a test fitting 120 with a pipe fitting 122, which is joined to a pipe 123, is shown in FIGS. 17–19. The test fitting 120 includes a fluid barrier 121 with a ring-shaped support 128. A plurality of flexible fins 130 extend around the periphery of the support ring 128. The fins 130 give way when the test fitting 120 is pressed into the pipe fitting 102, and can be caused to bend in either direction. The fins 130 press outwardly against the walls of the pipe fitting 102 to form a fluid tight and secure seal which may not even need an adhesive, although an adhesive might be desirable under certain circumstances. It might also be possible to form the barrier integrally with the elastic seal means, for example through a single injection molding process.

Figure 5:
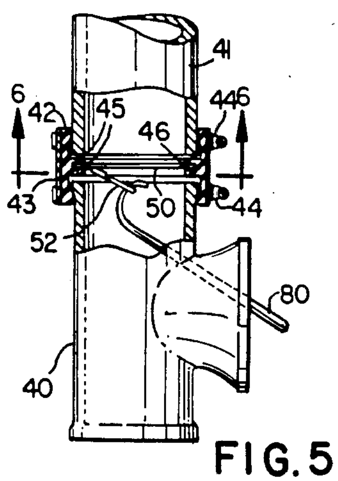
FIG. 5 is a side elevation of the embodiment of FIG. 4 as assembled, partially in section.
Figure 6:
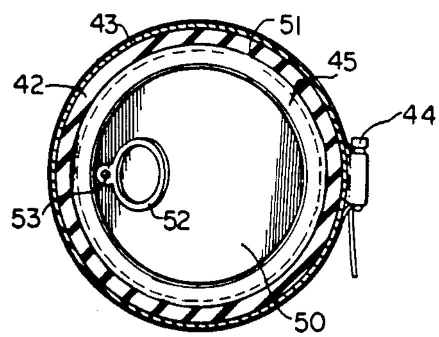
FIG. 6 is a cross-section taken along line 6—6 in FIG. 5.
Figure 4:
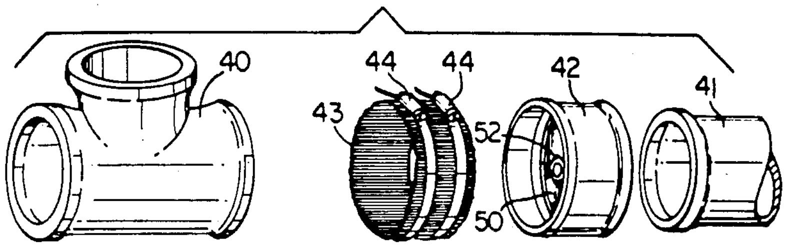
FIG. 4 is an exploded perspective view of another alternative embodiment.
Figure 7:
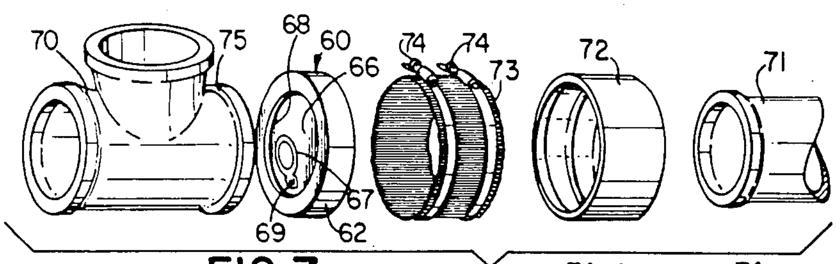
FIG. 7 is an exploded perspective view of an alternative embodiment.
Figure 8:
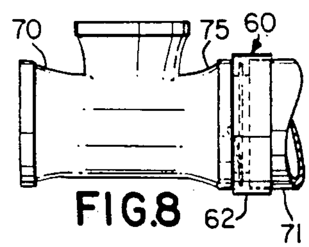
FIG. 8 is a side elevation of the embodiment of FIG. 7, partially assembled.
Figure 9:
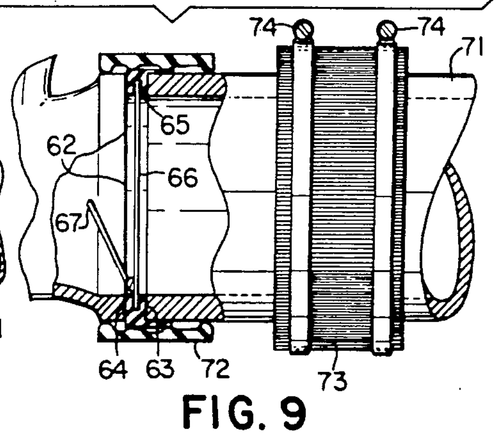
FIG. 9 is a side elevation of the embodiment of FIG. 7 at a stage of assembly subsequent to that of FIG. 8, partially in section.

Referring now to FIGS. 4–6, an alternative embodiment of the invention is shown for use with a different type of pipe joint which is commonly utilized for cast iron pipes. In this type of pipe joint a "T" fitting 40 would directly abut, end to end, a pipe section 41. A rubber sleeve 42 covers the joint, which in turn is held firmly in place by a metal sleeve 43 with sliding screw fasteners 44. Such a joint is shown in Evans U.S. Pat. No. 3,233,922. As before, a sealant can be included if desired. The joint is easily formed by slipping the rubber sleeve and the metal sleeve 43 over an end of pipe. The two pipe ends are brought together, and the rubber sleeve 42 and metal sleeve 43 are positioned over the joint. The screw fasteners 44 are tightened to secure the joint.

As modified in a second embodiment of this invention, the rubber sleeve 42 of such a joint is formed as a test fitting with internal parallel circumferential flanges 45 which receive therebetween a water impermeable barrier 46 with a removable seal portion 50. The flanges 45 preferably have a width equal to that of the pipe thickness so as to form a tight seal with the pipe ends. The seal 50 is formed in the barrier by means such as a scribe cut 51. Pull ring 52 is fastened to the seal 50 near the scribe cut 51 by means such as rivet 53. The rubber sleeve 42 may be directly molded to the barrier 46.

Installation of the test fitting is carried out much as the joint would normally be formed, except that caution must be taken to insure that the side of the fitting with the pull-ring 52 faces the "T" arm so that it can be reached by a finger or tool through that opening. The rubber sleeve fitting 42 should tightly seal the pipe and fitting ends. It is apparent then that this embodiment would be virtually as fast and easy to install as would the conventional joint, but with the pressure testing seal in place and ready for use.

In a third embodiment shown in FIGS. 7–11, the test fitting 60 includes an elastomeric support flange 62 with two parallel flanges 63, 64 extending radially inwardly at one end of the support flange 62. A water impermeable barrier 65 including a seal 66 is received by the groove 68 formed by the flanges 63, 64. The support flange 62 is molded with flanges 63, 64 which can also be directly molded to the barrier 65. The seal 66, as before, is preferably formed by a scribe cut 68 and has means such as pull-ring 67 mounted near the scribe cut 68, as by rivet 69, to effect separation of the seal from the surrounding disk material upon the application of manual force. Pull-ring 67 faces opposite the flange 62.

Figure 10:
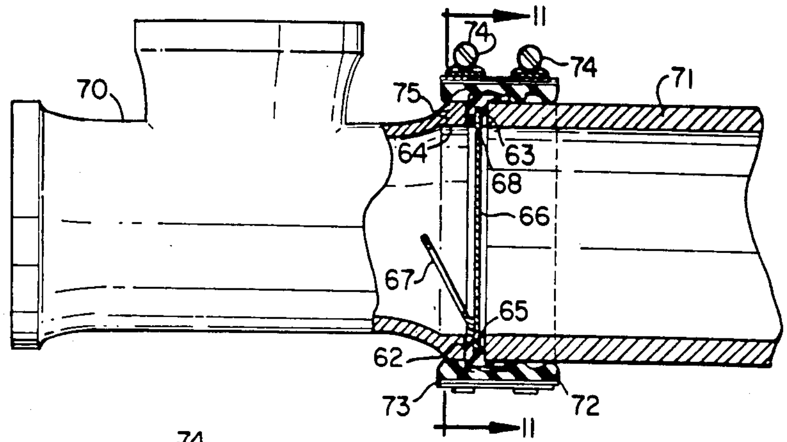
FIG. 10 is a side elevation of the embodiment of FIG. 7 as completely assembled, partially in section.
Figure 11:
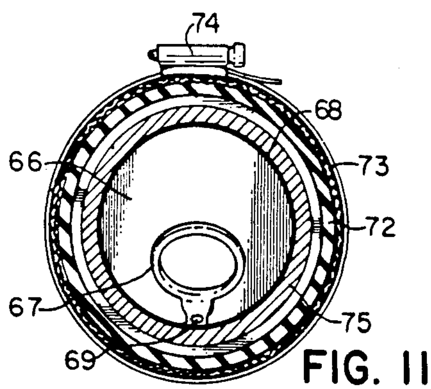
FIG. 11 is a cross-section taken along the line 11—11 in FIG. 10.

This embodiment of the invention would commonly be used with joints of the cast iron type and is suitable for use with a joint apparatus such as that of U.S. Pat. No. 3,233,922 as described above. The "T" section fitting 70 is joined to a pipe 71 by rubber sleeve 72 and metal sleeve 73 with screw fasteners 74. The test fitting 60 is first placed over an end of the pipe 71 (FIG. 8) with the pull ring 67 facing the T arm opening. The support flange 62 grips and seals the pipe 71. The joint is then completed using the conventional technique. The end of the pipe 71 is placed adjacent to the end 75 of the "T" fitting 70, with the test fitting 60 therebetween, and the rubber sleeve 72 over the pipe and fitting ends, and metal sleeve 73 over the pipe 71. The rubber sleeve 72 is positioned over the end of the pipe 71 and the end 75 of the "T" fitting 70 with the test fitting 60 therebetween (FIG. 9) to form a water-tight seal. The metal sleeve 73 is then positioned over the rubber sleeve 72 and the fasteners 74 are tightened to firmly hold the joint together (FIG. 10).

Figure 13:
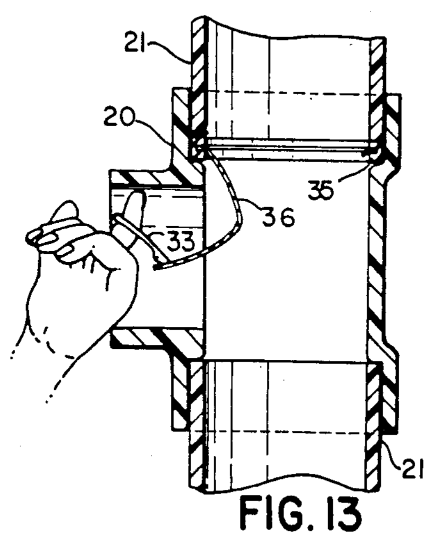
FIG. 13 is a cross-section of the embodiment of FIG. 1 at a stage of use subsequent to that shown in FIG. 12, wherein the frangible section has been nearly completely removed.
Figure 12:
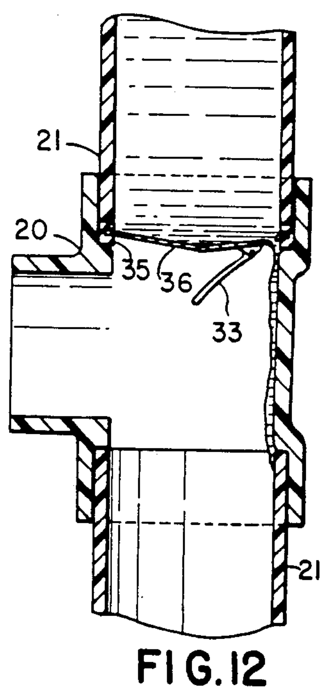
FIG. 12 is a cross-section of the embodiment of FIG. 1 filled with water above the apparatus at the conclusion of a successful test, the frangible section being bent and partially broken.

Pressure testing with the invention may be quickly completed. The system upstream from the fitting is filled with water to subject it to water pressure. The joint is then checked for leaks. If the results are satisfactory, the seal portion is ready to be removed. An index finger or instrument such as hook 80 (FIG. 5) is placed into the ring and the pull-ring is lifted, causing it to pivot on the rivet and to separate an adjacent portion of the seal at the scribe cut from the surrounding disk material (FIG. 12). Water will slowly trickle through the break, thereby avoiding gushing problems associated with the prior art. The ring is also preferably positioned oppositely from the open "T" arm, as shown, during installation such that the initial break will occur at the back of the fitting and the water will not tend to splash out of the open arm as it trickles down. When the water has been drained, the seal is removed by pulling the ring, causing the seal to tear away from the surrounding material at the scribe cut (FIG. 13). Subsequent sections may then be added with the assurance the seal is water tight.

It is desirable to provide structure which will bleed water past the barrier so that a defective joint can be repaired or re-formed without interference from water. In FIGS. 14–16 there is shown a nipple 200 adapted to be detachably mounted through an aperture in the barrier 111. The nipple 200 has a central passageway 201 which will permit fluid flow therethrough. A nut 204 is provided preferably at the end of the nipple 200 which is directed away from the pipe fitting 102. A metal washer 210 and rubber washer 212 can be provided between the barrier 111 and the nut 204 to tightly seal the nipple 200 to the barrier 111 when the nut 204 is tightened toward the barrier 111. Tightening of the nut 204 may be accomplished in conjunction with threaded structure 216 on the nipple 200. A detachable nut or permanently attached flange 220 engages the nipple 200 such that tightening of the nut 204 will pull attached flange 220, the metal washer 210, and the rubber washer 212 tightly against the barrier 111. A flexible conduit 224 may be affixed over the end of the nipple 200 that is directed toward the pipe fitting 102. A split ring or other keeper 230 may be used to secure the conduit 224 to the nipple 200. Suitable means such as a valve 234 may be provided in the conduit 224 to prevent fluid flow through the nipple 200 and the conduit 224 when flow is not desired.

Should a joint fail a test, it is a simple matter to open the valve 234, by access to the conduit through the opening 240, to allow drainage of the fluid past the barrier 111. The water will flow through the conduit 224, through the pipe fitting 102 and through the system. The evacuated joint can then be re-formed. The valve 234 is then closed and the joint retested. If the joint is acceptable, the seal portion 242 of the barrier 111 is removed, as by the pull-ring 246, and fluid flow through the pipe and fitting system will be substantially unobstructed. The nipple 216 may be removed from the seal 242 by removing the nut 204, so that the nipple and conduit assembly can be used again.

The nipple or similar structure can alternatively be permanently formed in the seal. Such an embodiment is shown in FIGS. 17–19, where a nipple 250 with a passageway 252 therethrough is formed in the seal portion 256 of the barrier 121. The nipple 250 is preferably directed toward the pipe fitting 122. A flexible conduit 260 may be attached to the nipple 250 by suitable means such as a keeper 262. Suitable means such as a clamp 266 is used to releasably prevent fluid flow through the nipple 250 and conduit 260 when not desired. Should the joint fail, the clamp 266 can be accessed through the opening 270. The clamp 266 is opened to allow fluid flow past the barrier 121. Water will flow through the nipple 250 and conduit 260, and through of the pipe fitting 122. The evacuated joint can then be re-formed. The clamp 266 can be tightened on the conduit 260 to prevent fluid flow therethrough, and testing of the joint can again be performed. If the joint is acceptable, the seal 256 can be finally removed, as by the pull-ring 274, and fluid flow through the pipe and fitting system will be substantially unobstructed. The conduit 260 and clamp 266 can be removed from the nipple 250 and reused with another test fitting.

It may be desirable to deepen the scribe cut near the pull-ring to insure that only this portion of the seal is broken away initially, so that water trickles through this break rather than gushes through a larger separation which might otherwise accidentally occur. Other means to achieve initial separation only at a portion of the seal would be apparent to one skilled in the art.

It is preferable that the seal 36 define an area roughly equivalent to a cross section of the inside of the pipe so that, when the seal is removed, fluid flow through the pipe will be unobstructed by remaining portions of the barrier or test fitting.

The scribe cut should not so weaken the disk material as to cause it to yield under pressure normally associated with pressure testing. It should be deep enough, however, to allow relatively easy removal of the interior portion with ordinary manual force.

While a scribe cut has been referred to as the preferred choice in forming the seal, it is also possible to use other constructions for removing the seal material to permit fluid flow through the test fitting. These other constructions would be apparent to one of ordinary skill in the art. It is also possible to use other means known in the art to strengthen the barrier material to resist buckling, and separation, during pressure testing. Typically, these would include ridges, creases or support structure known to perform such a function.

The seal can be made of any material which can withstand pressure associated with pressure testing, is resitant to deterioration with age, and can be suitably fashioned with means for removing the seal in accordance with the herein described inventive principles. Presently preferred materials include aluminum, tin, plastic and rubber. In yet another embodiment, the seal may be designed to "crumble" rather than tear away, so that is could be literally pulled from its mounting flange and removed altogether.

This invention may be embodied in other specific forms without departing from the spirit or essential attributes thereof, and accordingly, reference should be made to the appended claims, rather than to the foregoing specification, as indicating the scope of the invention.

I claim:

1. A test fitting for use in pressure testing pipe and fitting systems during the installation thereof, comprising:

- a water impermeable barrier adapted to block fluid flow through said pipe and fitting system;
- means for sealably and permanently installing said barrier into a fitting in said pipe and fitting systems, said means for installing comprising elastic, fluid resistant means about the periphery of the barrier adapted to press outwardly from the barrier and seal the barrier against an interior wall of said fitting; and,
- frangible, removable seal means in said barrier permitting fluid flow therethrough when broken and removed, a portion of said barrier remaining in said fitting in said pipe and fitting systems, said portion of said barrier being insufficient to substantially impede fluid flow through said fitting.

2. The test fitting of claim 1, wherein said means for installing said barrier comprises a support ring encircling and engaging the perimeter of said barrier, said elastic means being provided on the outer periphery of said support ring, whereby said support ring is adapted for fixed attachment to an interior wall of said pipe and fitting system.

3. The test fitting of claim 2, wherein said elastic means comprises an elastomeric o-ring mounted about the periphery of said support ring.

4. The test fitting of claim 3, wherein said o-ring is mounted in a channel formed in said support ring.

5. The test fitting of claim 2, wherein said elastic means comprises a plurality of fins mounted circumferentially about said support ring, said fins beign adapted to press radially outwardly against the interior wall of said pipe and fitting system.

6. The test fitting of claim 1, wherein said seal means comprises a scribe-out formed defining a loop, formed in said barrier.

7. The test fitting of claim 6, wherein said scribe cut is substantially coincident with an inside circumference of said pipe.

8. The test fitting of claim 6, wherein said seal means further comprises means for transmitting a manual force to said scribe cut.

9. The test fitting of claim 8, wherein said means for transmitting a manual force to said scribe cut comprises a ring secured to said seal means adjacent part of said scribe cut.

10. The test fitting of claim 9, wherein said scribe cut is deeper nearest said ring.

11. The test fitting of claim 1, wherein said seal means further comprises strengthening means.

12. A test fitting for use in pressure testing pipe and fitting systems during the installation thereof, comprising:

a water impermeable barrier adapted to block fluid flow through said pipe and fitting system;

means for sealably and permanently installing said barrier into a fitting in said pipe and fitting system;

means for selectively bleeding water past said barrier; and, frangible, removable seal means in said barrier permitting fluid flow therethrough when broken and removed, a portion of said barrier remaining in said fitting in said pipe and fitting system, said portion of said barrier being insufficient to substantially impede fluid flow through said fitting.

13. The test fitting of claim 12, wherein said bleeding means comprises nipple means fixed to said barrier and having a passageway therethrough, and valve means associated with said nipple means to stop flow through the passageway.

14. The test fitting of claim 13, further comprising conduit means connected to said nipple means and adapted to pass fluid from said nipple means out of said fitting.

15. The test fitting of claim 13, wherein said nipple means is detachable with respect to said barrier.

16. The test fitting of claim 15, wherein said nipple means includes thread structure on an exterior surface thereof, barrier engagement structure secured to said threaded structure, and nut means on a side of said nipple opposite the barrier engagement structure and adapted to threadably engage said barrier between said barrier engagement structure and said nut means.

17. The test fitting of claim 16, further comprising seal means between said nut means and said barrier.

18. The test fitting of claim 17, wherein said seal means comprises a rubber washer.

* * * * *